UNITED STATES PATENT OFFICE.

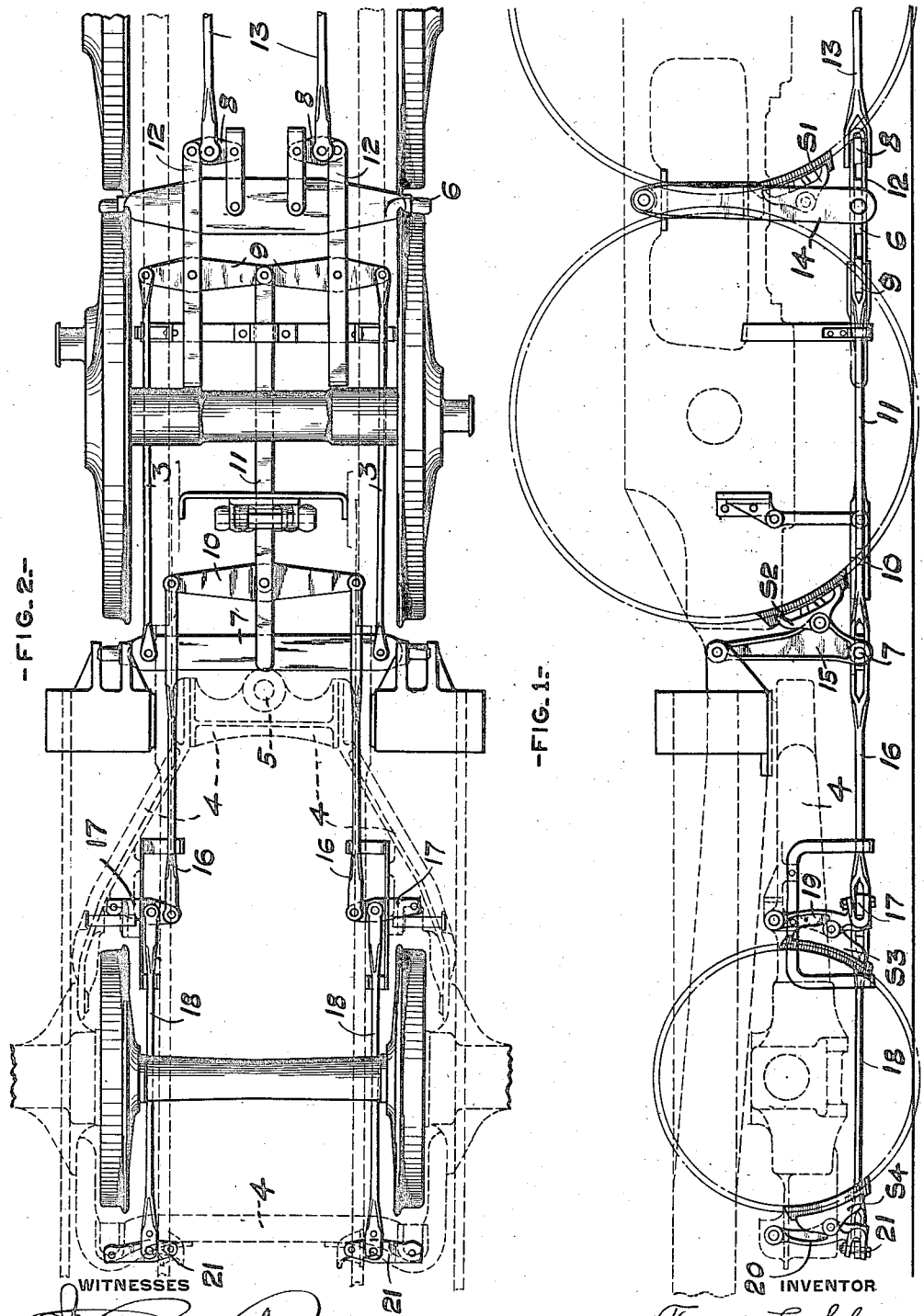

FRANCIS E. SCHWENTLER, OF ST. LOUIS, MISSOURI, ASSIGNOR TO AMERICAN BRAKE COMPANY, OF ST. LOUIS, MISSOURI, A CORPORATION OF MISSOURI.

BRAKE-RIGGING FOR RADIAL TRUCKS.

1,138,252.   Specification of Letters Patent.   Patented May 4, 1915.

Application filed September 16, 1914. Serial No. 861,970.

*To all whom it may concern:*

Be it known that I, FRANCIS E. SCHWENTLER, a citizen of the United States, and a resident of St. Louis, in the State of Missouri, have invented a certain new and useful Improvement in Brake-Rigging for Radial Trucks, of which improvement the following is a specification.

This invention relates to brake rigging for locomotives having radial trailer trucks, and has for its object to more fully equalize the braking stresses as applied to the radial trailer truck by employing a clasp type of brake therefor, and at the same time to so locate the respective pull rod and lever connections as to give the proper clearances for the ash pan and other parts of the locomotive in the radial movements of the truck.

In the accompanying drawings: Figure 1 is a side view of a brake design embodying my improvement, as applied to two rear pairs of drivers and radial trailer truck of a locomotive; and Fig. 2, a plan of the same, portions of the locomotive frame being indicated in dotted lines.

According to the construction shown in the drawing, my improvement is applied to the usual form of locomotive having a radial trailer truck, the journal boxes of which are carried on the frame, 4, pivoted at 5, to the main frame. Two pairs of driving wheels are shown having the customary brake beams, 6 and 7, connected to the respective hangers, 14 and 15, and carrying the brake heads and shoes, S¹ and S².

For operating the driver brakes the usual form of brake rigging may be employed, comprising the two sets of rods, 13, 12 and 3, and equalizing levers, 8 and 9, one set on each side of the locomotive, and if more than two pairs of driving wheels are employed, the rods, 13, will be connected to the corresponding equalizers for said additional wheels, as will be readily understood.

For actuating the brakes on the radial trailer truck, the rod, 11, connected to the inner ends of the two equalizer levers, 9, is located at substantially the center line of the locomotive, and is provided with a cross equalizer, 10, pivoted thereto at a point in close proximity to the pivot, 5, of the radial truck frame. The wheels of the trailer truck are provided with brake heads and shoes, S³ and S⁴, upon both sides thereof pivotally supported on the respective jaw hanger levers, 19 and 20, mounted on suitable brackets carried by the trailer frame, the lower ends of said hangers being pivotally connected to the respective short levers, 17 and 21, which are connected together by pull rods, 18, and actuated by rods, 16, connected to the outer ends of the cross equalizer, 10. The inner ends of the levers, 21, are pivoted on fixed fulcrums mounted on the frame, 4. By means of this construction, brake shoes are applied at both sides of the trailer truck wheels, without the use of brake beams, the truck levers, 17, and 21, being of suitable dimensions to give the desired braking pressures, and as the pull rods, 16, are spaced substantially the full width of the frame there is no interference of the brake rigging with the ash pan or other parts of the locomotive. The connecting rod, 11, is suitably guided at the center line of the locomotive to resist lateral movement when the brake is applied in passing around curves, and as the center of the cross equalizer, 10, is close to the trailer truck center pin, 5, the brake piston travel will be subjected to the least possible variation due to the swinging of the radial truck.

Having now described my invention, what I claim as new and desire to secure by Letters Patent is:

1. In a brake rigging for locomotives with trailer trucks, the combination of brake beams, hangers and shoes for the driving wheels, brake shoes applied to both sides of the trailer truck wheels, and two sets of equalizer levers and pull rods, one on each side, for actuating said brake beams and the brake shoes of the trailer truck.

2. In a brake rigging for locomotives with trailer trucks, the combination of brake beams, hangers and shoes for the driving wheels, equalizer levers and rods connected to said brake beams, a central connecting rod, a cross equalizer pivoted thereto, brake shoes applied to both sides of the trailer truck wheels, and rods connected at the outside ends of said cross equalizer for operating said brake shoes for the trailer truck.

3. In a brake rigging for locomotives with trailer trucks, the combination of brake beams, hangers and shoes for the driving wheels, equalizer levers and rods connected to said brake beams, a central connecting rod, a cross equalizer pivoted thereto, brake shoes applied to both sides of the trailer truck wheels, hanger levers therefor, truck levers pivotally connected to said hangers, pull rods connecting said truck levers together, and rods connecting said truck levers with the cross equalizer.

4. In a brake rigging for locomotives with trailer trucks, the combination of brake beams, hangers and shoes for the driving wheels, equalizer levers and rods connected to said brake beams, a centrally located connecting rod having guides, a cross equalizer pivoted thereto at a point near the radial truck pivot, brake shoes applied to both sides of the radial truck wheels, and rods connected to said cross equalizer for operating the brake shoes of said truck.

FRANCIS E. SCHWENTLER.

Witnesses:
C. C. ZIEGLER,
F. G. WILLIAMSON.